United States Patent [19]

Kuroda et al.

[11] 4,093,789
[45] June 6, 1978

[54] PROCESS FOR PREPARING POLYOLEFINS

[75] Inventors: Nobuyuki Kuroda; Toru Nakamura, both of Yokohama; Takeichi Shiraishi; Kazuo Matsuura, both of Kawasaki; Mituji Miyoshi, Naka, all of Japan

[73] Assignee: Nippon Oil Company, Limited, Tokyo, Japan

[21] Appl. No.: 705,607

[22] Filed: Jul. 15, 1976

[30] Foreign Application Priority Data

Aug. 12, 1975 Japan .................................. 50-97190

[51] Int. Cl.$^2$ .......................... C08F 4/02; C08F 10/02
[52] U.S. Cl. .................................. 526/114; 252/429 B; 252/429 C; 526/119; 526/125; 526/144; 526/153; 526/348; 526/352; 526/903; 526/906
[58] Field of Search ............... 526/114, 119, 124, 125, 526/144, 903

[56] References Cited

U.S. PATENT DOCUMENTS

| | | | |
|---|---|---|---|
| 3,357,967 | 12/1967 | Wesslau | 526/119 |
| 3,491,073 | 1/1970 | Marinak | 526/119 |
| 3,769,373 | 10/1973 | Reed et al. | 526/153 |

FOREIGN PATENT DOCUMENTS

| | | |
|---|---|---|
| 2,137,872 | 2/1972 | Germany. |
| 2,347,577 | 5/1974 | Germany. |
| 3,924,272 | 6/1962 | Japan. |
| 4,719,885 | 6/1972 | Japan. |
| 1,314,258 | 4/1973 | United Kingdom. |

OTHER PUBLICATIONS

Zeiss, Organometallic Chemistry, Reinhold Pub. Corp., N.Y. (1960) pp. 203–204.

*Primary Examiner*—Edward J. Smith

[57] ABSTRACT

According to the present invention, there is provided a process for preparing polyolefins by polymerizing or copolymerizing olefins in the presence of a catalyst consisting of a solid component and an organometallic compound component, characterized in that said solid component is obtained by copulverizing (1) a magnesium halide and/or a manganese halide,
(2) an aromatic hydrocarbon,
(3) a tetravalent titanium compound, and
(4) a trivalent titanium compound and in that said organometallic compound component is a mixture of (5) a trialkylaluminum and
(6) a compound represented by the general formula $AlR_nX_{3-n}$ wherein R is alkyl having 1 to 10 carbon atoms and may be the same or different, X is halogen and $0 < n < 3$.

9 Claims, No Drawings

PROCESS FOR PREPARING POLYOLEFINS

BACKGROUND OF THE INVENTION

1. Field of the Invention

This invention relates to a process for preparing polyolefins by use of a novel polymerization catalyst. More particularly, it is concerned with a process for preparing polyolefins by polymerizing or copolymerizing olefins in the presence of a catalyst, said catalyst comprising a combination of solid component which is obtained by copulverizing (1) a magnesium halide and/or a manganese halide, (2) an aromatic hydrocarbon, (3) a tetravalent titanium compound and (4) a trivalent titanium compound, and a mixture which consists of (5) a trialkylaluminum and (6) an organoaluminum compound of the general formula $AlR_nX_{3-n}$ wherein R is alkyl having 1 to 10 carbon atoms and may be the same or different, X is halogen and $0 < < 3$, whereby the yield of polymer per solid and that per transition metal are remarkably increased resulting in the process dispensing with the step of removing residual catalyst in the polymer and at the same time the bulk density of the resulting polymer is hightened, the molecular weight distribution thereof is widened and consequently the fluidity of the polymer in a molten state is improved.

2. Description of the Prior Art

Heretofore, in the technical field of this sort, applicant of the present invention has filed a patent application (Japanese Patent Application No. 5014/75) on his finding that if olefin polymerization is made by use of a catalyst which comprises a combination of a solid component obtained by copulverizing a magnesium halide and/or a manganese halide, an aromatic hydrocarbon and a titanium compound, and an organoaluminum compound and/or an organozinc compound, the catalyst activity is remarkably increased and also the bulk density of the resulting polymer is remarkably improved.

On the other hand, to the manufacturers of polyolefin it has been a matter of great concern to develop a catalyst whose activity is high enough to dispense with the step of removing residual catalyst and which affords a polyolefin having a sufficiently high bulk density and a good melt fluidity.

SUMMARY OF THE INVENTION

As a result of a keen study we have made to improve the fluidity of a molten polyolefin resin, we found that a polyolefin having a superior fluidity, that is, having a large flow parameter, can be prepared with an extremely high catalyst activity by use of, as a solid component, a solid powder obtained by copulverizing (1) a magnesium halide and/or a manganese halide, (2) an aromatic hydrocarbon, (3) a tetravalent titanium compound and (4) a trivalent titanium compound, and also by use of, as an organometallic compound component, a mixture of (5) a trialkylaluminum represented by the general formula $AlR_3$ wherein R is alkyl having 1 to 10 carbon atoms and may be same or different and (6) an organoaluminum compound of the general formula $AlR_nX_{3-n}$ wherein R is alkyl having 1 to 10 carbon atoms and may be the same or different, X is halogen and $0 < n < 3$. Thus we have solved the aforementioned problems and completed the present invention.

In the present invention, the flow parameter is defined by the following equation:

$$\text{Flow parameter} = \log\left(\frac{\text{Melt index at a load of 21.6 kg}}{\text{Melt index at a load of 2.16 kg}}\right)$$

Accordingly, the present invention provides a novel catalyst system which affords with a high catalyst activity polyolefins having a large flow parameter and a high bulk density.

Even if there is used as a solid component a solid powder obtained by copulverizing (1) a magnesium halide and/or a manganese halide, (2) an aromatic hydrocarbon, (3) a tetravalent titanium compound and (4) a trivalent titanium compound, if (5) trialkylaluminum alone is used as an organometallic compound component, it is impossible to obtain a satisfactory value of flow parameter and thus the object of the present invention is not attained. In the case where a compound of the general formula $AlR_nX_{3-n}$ alone is used as an organometallic compound component, the object of the present invention is not attained, either. Further, even if there is used as an organometallic compound component a mixture of a trialkylaluminum and a compound of the general formula $AlR_nX_{3-n}$, if as a solid component there is used a solid powder obtained by copulverizing only a magnesium halide and/or a manganese halide, an aromatic hydrocarbon and a tetravalent titanium compound, it is impossible to obtain a satisfactory value of flow parameter and thus the object of the present invention is not achieved, either. Moreover, in the case where there is used as a solid component a solid powder obtained by copulverizing only a magnesium halide and/or a manganese halide and a trivalent titanium compound, the object of the present invention is not accomplished. A polyolefin having a high bulk density and a satisfactory large flow parameter could be efficiently prepared only when there were used as a solid component a solid powder obtained by copulverizing (1) a magnesium halide and/or a manganese halide, (2) an aromatic hydrocarbon, (3) a tetravalent titanium compound and (4) a trivalent titanium compound, and as an organometallic compound component a mixture of (5) a trialkylaluminum and (6) a compound of the general formula $AlR_nX_{3-n}$. This is uninferable from the prior art and cannot but be considered to be a surprising fact. That is, it should be noted that only when the catalyst system comprising the six components as described in the present invention was used, the following three points, that is, a high catalyst activity, a high bulk density of the resulting polyolefin and a large flow parameter of the resulting polyolefin, all could be satisfied simultaneously.

DESCRIPTION OF THE INVENTION

Detailed features of the present invention are as mentioned below.

Magnesium halides employed in the present invention are substantially anhydrous magnesium dihalides, such as magnesium fluoride ($MgF_2$), magnesium chloride ($MgCl_2$), magnesium bromide ($MgBr_2$), and magnesium iodide ($MgI_2$), among which magnesium chloride is specially preferred.

As a manganese halide which may be employed in the present invention, manganese chloride ($MnCl_2$) is most preferred. A mixture of a magnesium halide and a manganese halide is also preferably employed in the present invention.

As aromatic hydrocarbons employed in the present invention, polycyclic aromatic hydrocarbons are preferred. Among these may be mentioned naphthalene, phenanthrene, triphenylene, chrysene, 3,4-benzophenanthrene, 1,2-benzochrysene, picene, anthracene, tetraphene, 1,2,3,4-dibenzanthracene, pentaphene, 3,4-benzopentaphene, tethracene, 1,2-benzotethracene, hexaphene, heptaphene, diphenyl, fluorene, biphenylene, perylene, coronene, bisantene, ovalene, pyrene, perinaphthene, and halogen- and alkyl-substituted products thereof. Monocyclic aromatic compounds such as benzene, toluene and xylene, as well as their halogen- and alkyl-substituted products, are also employable.

As tetravalent titanium compounds employed in the present invention there are mentioned those titanium compounds which are used in known Ziegler catalysts. Preferable tetravalent titanium compounds are the compounds represented by the general formula $Ti(OR)_nX_{4-n}$ wherein R is an alkyl, allyl, aryl or aralkyl group having 1 to 20 carbon atoms, preferably 1 to 8 carbon atoms, X is halogen atom and n is a whole number of from 0 to 4. Examples of the tetravalent titanium compounds are $TiCl_4$, $TiBr_4$, $TiI_4$, $Ti(OCH_3)Cl_3$, $Ti(OCH_3)Br_3$, $Ti(OCH_3)_2Cl_2$, $Ti(OCH_3)_2Br_2$, $Ti(OCH_3)_3Cl$, $Ti(OCH_3)_4$, $Ti(OC_2H_5)Cl_3$, $Ti(OC_2H_5)Br_3$, $Ti(OC_2H_5)_2Cl_2$, $Ti(OC_2H_5)_2Br_2$, $Ti(OC_2H_5)_3Cl$, $Ti(OC_2H_5)_4$, $Ti(On-C_3H_7)Cl_3$, $Ti(On-C_3H_7)_2Cl_2$, $Ti(Oi-C_3H_7)Cl_3$, $Ti(Oi-C_3H_7)Br_3$, $Ti(Oi-C_3H_7)_2Cl_2$, $Ti(Oi-C_3H_7)_2Br_2$, $Ti(Oi-C_3H_7)_3Cl$, $Ti(Oi-C_3H_7)_4$, $Ti(On-C_4H_9)Cl_3$, $Ti(On-C_4H_9)_2Cl_2$, $Ti(On-C_4H_9)_3Cl$, $Ti(On-C_4H_9)_4$, $Ti(Oi-C_4H_9)Cl_3$, $Ti(Oi-C_4H_9)_2Cl_2$, $Ti(Oi-C_4H_9)_3Cl$, $Ti(Oi-C_4H_9)_4$, $Ti(Ot-C_4H_9)Cl_3$, $Ti(Ot-C_4H_9)_2Cl_2$, $Ti(Ot-C_4H_9)_3Cl$, $Ti(Ot-C_4H_9)_4$, $Ti(On-C_5H_{11})Cl_3$, $Ti(On-C_6H_{13})Cl_3$, $Ti(OC_6H_5)Cl_3$, $Ti(OC_6H_5)_2Cl_2$, $Ti(OC_6H_5)_3Cl$, $Ti(OC_6H_5)_4$, $Ti(OCH_3)(OC_2H_5)Cl_2$, $Ti(OC_2H_5)(Oi-C_4H_9)Cl_2$, $Ti(OC_2H_5)(Oi-C_3H_7)Cl_2$, $Ti(OC_2H_5)(OC_6H_5)Cl_2$, $Ti(OCH_3)_2(Oc_2H_5)_2$, $Ti(OC_2H_5)_2(Oi-C_4H_9)_2$, reaction product of $SiCl_4$ and the compound $Ti(OR)_mX_{4-m}$ and mixtures thereof.

Trivalent titanium compounds employed in the present invention are not specially restricted. Among these may be mentioned titanium trihalides obtained by reducing titanium tetrahalides with hydrogen, aluminum, titanium or an organometallic compound such as organoaluminum compound. Preferable titanium trihalides are $TiCl_3$, $TiCl_3 \cdot \frac{1}{3} AlCl_3$, and $TiBr_3$. Trivalent titanium compounds except titanium trihalides may be obtained by reducing various tetravalent titanium alkoxyhalides represented by the general formula $Ti(OR)_nX_{4-n}$ wherein R is alkyl, allyl, aryl or aralkyl group having 1 to 20 carbon atoms, X is halogen atom and n is a whole number of from 1 to 4, with an organometallic compound of a metal of the groups I to III of the periodic table, at a temperature of from $-80°$ to $200°$ C, preferably $0°$ to $100°$ C and a molar ratio of titanium alkoxyhalide to organometallic compound being in the range of from 1 : 5 to 5 : 1, preferably 1 : 2 to 2 : 1.

As trialkylaluminum used in the present invention there are mentioned $Al(CH_3)_3$, $Al(C_2H_5)_3$, $Al(n-C_3H_7)_3$, $Al(i-C_3H_7)_3$, $Al(n-C_4H_9)_3$, $Al(i-C_4H_9)_3$, $Al(t-C_4H_9)_3$, $Al(n-C_5H_{11})_3$, $Al(n-C_6H_{13})_3$, $Al(n-C_8H_{17})_3$, $Al(n-C_{10}H_{21})_3$, and mixtures thereof.

By way of illustrating the compounds of the general formula $AlR'_nX_{3-n}$ which may be employed in the present invention, mention may be made of the following: $Al(CH_3)_2Cl$, $Al(CH_3)_2Br$, $Al(C_2H_5)_2Cl$, $Al(C_2H_5)_2Br$, $Al(Ch_2H_5)_2F$, $Al(C_2H_5)_2I$, $Al(C_2H_5)Cl_2$, $Al(n-C_3H_7)_2Cl$, $Al(i-C_3H_7)_2Cl$, $Al(i-C_3H_7)_2Br$, $Al(n-C_4H_9)_2Cl$, $Al(i-C_4H_9)_2Cl$, $Al(t-C_4H_9)_2Cl$, $Al(n-C_5H_{11})_2Cl$, $Al(n-C_6H_{13})_2Cl$, $Al(n-C_8H_{17})_2Cl$, $Al((n-C_{10}H_{21})_2Cl$, $Al(C_2H_5)_{1.5}Cl_{1.5}$, and mixture thereof.

In the present invention, in copulverizing (1) a magnesium halide and/or a manganese halide, (2) an aromatic hydrocarbon, (3) a tetravalent titanium compound and (4) a trivalent titanium compound, the order of adding these components is not specially restricted. That is, the copulverization may be performed in a simultaneous presence of all these components; or by copulverizing a magnesium halide and/or a manganese halide and an aromatic hydrocarbon and subsequently adding a trivalent and a tetravalent titanium compounds followed by application of a further copulverization; or by copulverizing a magnesium halide and/or a manganese halide and a trivalent and a tetravalent titanium compounds and subsequently adding an aromatic hydrocarbon followed by a further copulverization; or by copulverizing an aromatic hydrocarbon and a trivalent and a tetravalent titanium compounds, thereafter adding a magnesium halide and further applying a copulverization. It goes without saying that these operations should be done in an inert gas atmosphere and moisture should be avoided as far as possible.

Although the apparatus to be used for the copulverization is not specially restricted, usually employed are ball mill, vibration mill, rod mill and impact mill. Conditions such as pulverization temperature and pulverization time can readily be decided by those skilled in the art according to the method of pulverization. Generally adopted are pulverization temperatures in the range of from $0°$ to $200°C$ and preferably from $20°$ to $100°$ C, and pulverization time in the range of from 0.5 to 50 hours and preferably from 1 to 30 hours.

The mixing ratio of a magnesium halide and/or a manganese halide and an aromatic hydrocarbon is not specially restricted, but with a too large amount of an aromatic hydrocarbon, the polymerization activity is apt to lower and with a too small amount thereof, the effect of adding an aromatic hydrocarbon cannot be expected. It is preferable that the weight ratio of a magnesium halide and/or a manganese halide to an aromatic hydrocarbon be in the range of from 1:0.5 to 1:0.01.

The amount of a tetravalent and a trivalent titanium compounds to be supported is preferably adjusted so that the amount of titanium contained in the resulting solid is in the range of from 0.5 to 20% by weight, and the range of from 1 to 8% by weight is specially desirable in order to obtain a well-balanced activity per titanium and per solid. The mixing ratio of a tetravalent titanium compound and a trivalent titanium compound is not specially restricted, it usually being such that the molar ratio of tetravalent titanium compound to trivalent titanium compound is in the range of 1:50 to 50:1.

The mixing ratio of a trialkylaluminum and a compound of the general formula $AlR_nX_{3-n}$ which are used as an organometallic compound component in the present invention, can be selected in a wide range. Usually it is such that the molar ratio of trialkylaluminum to $AlR_nX_{3-n}$ is in the range of from 1:1000 to 1:2 and preferably from 1:200 to 1:3.

The amount of the organometallic compound component used in the present invention is not specially restricted. Usually it may be used in the range of from 0.1 to 1000 moles per mole of titanium compound.

Olefin polymerization reaction using the catalyst of the present invention is conducted in the same way as in olefin polymerization reactions using conventional Ziegler catalysts. That is, a substantially oxygen- and moisture-free condition is maintained throughout the reaction. Olefin polymerization conditions involve temperatures in the range of from 20° to 120° C and preferably from 50° to 100° C, pressures from atmospheric to 70 kg/cm.$^2$G and preferably from 2 to 60 kg/cm.$^2$G. Molecular weight can be adjusted to a certain extent by changing polymerization conditions such as the polymerization temperature and the molar ratio of catalyst, but the adjustment can be made more effectively by adding hydrogen into the polymerization system. With the catalyst of the present invention, a two- or more-stage polymerization reaction having different polymerization conditions such as different hydrogen concentrations and different polymerization temperatures can of course be made without any trouble.

The process of the present invention can be applied to the polymerization of all olefins that are polymerizable with Ziegler catalysts. For example, it is suitably applied to the homopolymerization of $\alpha$-olefins such as ethylene, propylene, and 1-butene, and to the copolymerization of ethylene and propylene, ethylene and 1-butene, and propylene and 1-butene. Further, copolymerization with dienes aiming at modification of polyolefin, for example, copolymerization of ethylene and butadiene and that of ethylene and 1,4hexadiene, is also preferably conducted.

Description of Preferred Embodiments

The following examples are further illustrative of the present invention. It is to be understood, however, that the invention is not limited thereto.

EXAMPLE 1

(a) Preparation of Catalyst

In a stainless steel pot with a content volume of 400 ml containing 25 stainless steel balls each ½ inch in diameter were placed 10 g of magnesium chloride (a commercially available anhydrous magnesium chloride which has been treated in HCl gas stream at 350° C for 20 hours), 1.2 g of anthracene, 2.6 g of titanium tetrachloride and 0.9 g of aluminum-reduced titanium trichloride (TiCl$_3$ · ⅓ AlCl$_3$), and a ball milling was applied for 16 hours at room temperature under a nitrogen atmosphere. The resulting solid powder contained 59 mg of titanium per g of the solid.

(b) Polymerization

A 2 liter stainless steel autoclave equipped with an induction stirrer was purged with nitrogen, in which were then placed 1,000 ml of hexane, 4.9 millimole of diethylaluminum monochloride, 0.1 millimole of triethylaluminum and 30 mg of the solid powder prepared above, and the temperature was raised to 90° C with stirring. The system, which as at a pressure of 2 kg/cm.$^2$G due to the vapor pressure of hexane, was pressurized with hydrogen to a total pressure of 7.2 kg/cm.$^2$G and then with ethylene to a total pressure of 10 kg/cm.$^2$G while polymerization was started. The polymerization was continued for 1 hour while ethylene was continuously introduced to maintain the total pressure at 10 kg/cm.$^2$G. The polymer slurry was then transferred into a beaker and hexane removed under reduced pressure to give 155 g of polyethylene having a melt index of 0.35 and a bulk density of 0.31. Catalyst activity was 31,360 g polyethylene/g Ti·hr·C$_2$H$_4$ pressure, 1,850 g polyethylene/g solid·hr·C$_2$H$_4$ pressure. The polyethylene had a flow parameter of 1.91 and its melt fluidity was extremely good.

Comparative EXAMPLE 1

In the autoclave used in Example 1 were placed 1,000 ml of hexane, 30 mg of the solid powder prepared in Example 1, and 2 millimole of triethylaluminum, and the temperature was raised to 65° C with stirring. The system was pressurized with hydrogen to a total pressure of 5.4 kg/cm.$^2$G and then with ethylene to a total pressure of 10 kg/cm.$^2$G while polymerization was conducted for 1 hour in the same way as in Example 1 to give 225 g of a white polyethylene having a melt index of 0.41 and a bulk density of 0.26. Catalyst activity was 27,630 g polyethylene/g Ti·hr·C$_2$H$_4$ pressure, 1,630 g polyethylene/g solid·hr·C$_2$H$_4$ pressure. The polyethylene had a flow parameter of 1.52 and its melt fluidity was remarkably inferior as compared with Example 1.

Comparative EXAMPLE 2

In the autoclave used in Example 1 were placed 1,000 ml of hexane, 30 mg of the solid powder prepared in Example 1, and 2 millmole of diethylaluminum monochloride, and the temperature was raised to 90° C with stirring. The system was pressurized with hydrogen to a total pressure of 7.6 kg/cm.$^2$G and then with ethylene to a total pressure of 10 kg/cm.$^2$G while polymerization was conducted for 1 hour in the same way as in Example 1 to give 76 g of a white polyethylene having a melt index of 0.55 and a bulk density of 0.27. Catalyst activity was 17,800 g polyethylene/g Ti·hr·C$_2$H$_4$ pressure, 1,050 g polyethylene/g solid·hr·C$_2$H$_4$ pressure. The polyethylene had a flow parameter of 1.72 and its melt fluidity was inferior as compared with Example 1.

Comparative EXAMPLE 3

In the ball mill pot described in Example 1 were placed 10 g of the magnesium chloride used in Example 1, 1.2 g of anthracene and 2.6 g of titanium tetrachloride, and a ball milling was applied for 16 hours at room temperature under a nitrogen atmosphere. The resulting solid powder contained 48 mg of titanium per g of the solid.

In the autoclave described in Example 1 were placed 1,000 of hexane, 4.9 millimole of diethylaluminum monochloride, 0.1 millimole of triethylaluminum and 30 mg of the solid powder prepared above, and the temperature was raised to 90° C with stirring. The system was pressurized with hydrogen to a total pressure of 5.4 kg/cm.$^2$G and then with ethylene to a total pressure of 10 kg/cm.$^2$G while polymerization was conducted for 1 hour in the same way as in Example 1 to give 270 g of a white polyethylene having a melt index of 0.33 and a bulk density of 0.29. Catalyst acitivity was 40,830 g polyethylene/g Ti·hr·C$_2$H$_4$ pressure, 1,960 g polyethylene/g solid·hr·C$_2$H$_4$ pressure. The polyethylene had a low flow parameter of 1.51 and its melt fluidity was remarkably inferior as compared with Example 1.

Comparative EXAMPLE 4

In the ball mill pot described in Example 1 were placed 10 g of the magnesium chloride used in Example 1, 1.2 g of anthracene and 2.4 g of titanium trichloride, and a ball milling was applied for 16 hours at room temperature under a nitrogen atmosphere. The resulting solid powder contained 43 mg of titanium per g of the solid.

In the autoclave described in Example 1 were placed 1,000 ml of hexane, 4.9 millimole of diethylaluminum monochloride, 0.1 millimole of triethylaluminum and 30 mg of the solid powder prepared above, and the temperature was raised to 90° C with stirring. The system was pressurized with hydrogen to a total pressure of 7.6 kg/cm.$^2$G and then with ethylene to a total pressure of 10 kg/cm.$^2$G while polymerization was conducted in the same way as in Example 1 to give 117 g of a white polyethylene having a melt index of 0.37 and a bulk density of 0.23. Catalyst activity was 37,910 g polyethylene/g Ti·hr·C$_2$H$_4$ pressure, 1,630 g polyethylene/g solid·hr·C$_2$H$_4$ pressure. The polyethylene had a flow parameter of 1.65 and its melt fluidity was inferior as compared with Example 1.

Comparative EXAMPLE 5

In the ball mill pot described in Example 1 were placed 10 g of the magnesium chloride used in Example 1, 0.5 g of titanium trichloride and 3.4 g of titanium tetrachloride, and a ball milling was applied for 16 hours at room temperature under a nitrogen atmosphere. The resulting solid powder contained 71 mg of titanium per g of the solid.

In the autoclave described in Example 1 were placed 1,000 ml of hexane, 4.9 millimole of diethylaluminum monochloride, 0.1 millimole of triethylaluminum and 15 mg of the solid powder prepared above, and the temperature was raised to 90° C with stirring. The system was pressurized with hydrogen to a total pressure of 6 kg/cm.$^2$G then with ethylene to a total pressure of 10 kg/cm.$^2$G while polymerization was conducted for 1 hour in the same way as in Example 1 to give 73 g of a white polyethylene having a melt index of 0.24 and a bulk density of 0.16. Catalyst activity was 17,040 g polyethylene/g Ti·hr·C$_2$H$_4$ pressure, 1,210 g polyethylene/g solid·hr·C$_2$H$_4$ pressure. The polyethylene had a flow parameter of 1.79 and its melt fluidity was good, but the bulk density of the polyethylene particles was low.

EXAMPLE 2

In the ball mill pot described in Example 1 were placed 10 g of the magnesium chloride used in Example 1, 1.2 g of anthracene, 1.1 g of titanium tetrachloride and 2.5 g of titanium trichloride, and a ball milling was applied for 16 hours at room temperature under a nitrogen atmosphere. The resulting solid powder contained 60 mg of titanium per g of the solid.

In the autoclave described in Example 1 were placed 1,000 ml of hexane, 4.8 millimole of diethylaluminum monochloride, 0.2 millimole of triethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made in the same procedure as in Example 1 to give 195 g of a white polyethylene having a melt index of 0.32 and a bulk density of 0.31. Catalyst activity was 38,670 g polyethylene/g Ti·hr·C$_2$H$_4$ pressure, 2,320 g polyethylene/g solid·hr·C$_2$H$_4$ pressure. The polyethylene had a flow parameter of 1.90 and its melt fluidity was good.

EXAMPLE 3

In the ball mill pot described in Example 1 were placed 10 g of the magnesium chloride used in Example 1, 1.2 g of naphthalene, 2.6 g of titanium tetrachloride and 0.9 g of titanium trichloride, and a ball milling was applied for 16 hours at room temperature under a nitrogen atmosphere. The resulting solid powder contained 57 mg of titanium per g of the solid.

In the autoclave described in Example 1 were placed 1,000 ml of hexane, 4.9 millimole of diethylaluminum monochloride, 0.1 millimole of triethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made in the same procedure as in Example 1 to yield 145 g of a white polyethylene having a melt index of 0.36 and a bulk density of 0.30. Catalyst activity was 30,350 g polyethylene/g Ti·hr·C$_2$H$_4$ pressure, 1,730 g polyethylene/g solid·hr·C$_2$H$_4$ pressure. The polyethylene had a flow parameter of 1.92 and its melt fluidity was good.

EXAMPLE 4

In the ball mill pot described in Example 1 were placed 10 g of the magnesium chloride used in Example 1, 1.2 g of fluorene, 2.6 g of titanium tetrachloride and 0.9 g of titanium trichloride, and a ball milling was applied for 16 hours at room temperature under a nitrogen atmosphere. The resulting solid powder contained 61 mg of titanium per g of the solid.

In the autoclave described in Example 1 were placed 1,000 ml of hexane, 4.9 millimole of diethylaluminum monochloride, 0.1 millimole of triethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made for 1 hour in the same procedure as in Example 1 to yield 175 g of a white polyethylene having a melt index of 0.31 and a bulk density of 0.30. Catalyst activity was 34,100 g polyethylene/g Ti·hr·C$_2$H$_4$ pressure, 2,080 g polyethylene/g solid·hr·C$_2$H$_4$ pressure. The polyethylene had a flow parameter of 1.93 and its melt fluidity was extremely good.

EXAMPLE 5

In the ball mill pot described in Example 1 were placed 10 g of the magnesium chloride used in Example 1, 1.2 g of phenanthrene, 2.6 g of titanium tetrachloride and 0.9 g of titanium trichloride, and a ball milling was applied for 16 hours at room temperature under a nitrogen atmosphere. The resulting solid powder contained 59 mg of titanium per g of the solid.

In the autoclave described in Example 1 were placed 1,000 ml of hexane, 4.9 millimole of diethylaluminum monochloride, 0.1 millimole of triethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made for 1 hour in the same procedure as in Example 1 to yield 160 g of a white polyethylene having a melt index of 0.61 and a bulk density of 0.29. Catalyst activity was 32,370 g polyethylene/g Ti·hr·C$_2$H$_4$ pressure, 1,920 g polyethylene/g solid·hr·C$_2$H$_4$ pressure. The polyethylene had a flow parameter of 1.88 and its melt fluidity was good.

EXAMPLE 6

In the ball mill pot described in Example 1 were placed 10 g of the magnesium chloride used in Example 1, 1.2 g of anthracene, 2.6 g of diisopropoxydichlorotitanium and 0.9 g of titanium trichloride, and a ball milling was applied for 16 hours at room temperature under a nitrogen atmosphere. The resulting solid powder contained 51 mg of titanium per g of the solid.

In the the autoclave described in Example 1 were placed 1,000 ml of hexane, 4.9 millimole of diethylaluminum monochloride, 0.1 millimole of tirethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made for 1 hour in the same procedure as in Example 1 to yield 181 g of a white polyethylene having a melt index of 0.23 and a bulk density of 0.34. Catalyst activity was 42,160 g polyethylene/g Ti·hr·$C_2H_4$ pressure, 2,150 g polyethylene/g solid·hr·$C_2H_4$ pressure. The polyethylene had a flow parameter of 1.99 and its melt fluidity was good.

EXAMPLE 7

In the ball mill pot described in Example 1 were placed 10 g of anhydrous manganese chloride, 1.2 g of anthracene, 2.6 g of titanium tetrachloride and 0.9 g of titanium trichloride, and a ball milling was applied for 16 hours at room temperature under a nitrogen atmosphere. The resulting solid powder contained 59 mg of titanium per g of the solid.

In the autoclave described in Example 1 were placed 1,000 ml of hexane, 4.9 millimole of diethylaluminum monochloride, 0.1 millimole of tirethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made for 1 hour in the same procedure as in Example 1 to yield 45 g of a white polyethylene having a melt index of 0.26 and a bulk density of 0.31. Catalyst activity was 9,150 g polyethylene/g Ti·hr·$C_2H_4$ pressure, 540 g polyethylene/g solid·hr·$C_2H_4$ pressure. The polyethylene had a flow parameter of 1.98 and its melt fluidity was good.

COMPARATIVE EXAMPLE 6

In the ball mill pot described in Example 1 were placed 10 g of anhydrous manganese chloride, 2.6 g of titanium tetrachloride and 0.9 g of titanium trichloride, and a ball milling was applied for 16 hours at room temperature under a nitrogen atmosphere. The resulting solid contained 65 mg of titanium per g of the solid.

In the autoclave described in Example 1 were placed 1,000 ml of hexane, 4.9 millimole of diethylaluminum monochloride, 0.1 millimole of tirethylaluminum and 30 mg of the solid powder prepared above, and the temperature was raised to 90° C with stirring. The system was pressurized with hydrogen to a total pressure of 7.2 kg/cm.$^2$G and then with ethylene to a total pressure of 10 kg/cm.$^2$G while polymerization was made for 1 hour in the same procedure as in Example 1 to yield 41 g of a white polyethylene having a melt index of 0.30 and a bulk density of 0.14. Catalyst activity was 7,540 g polyethylene/g T1·hr·$C_2H_4$ pressure, 490 g polyethylene/g solid·hr·$C_2H_4$ pressure. The polyethylene had a flow parameter of 1.90 and its melt fluidity was good, but the bulk density of the polyethylene particles was low.

EXAMPLE 8

In the autoclave used in Example 1 were placed 1,000 ml of hexane, 30 mg of the solid powder prepared in Example 1, 4.9 millimole of diethylaluminum monochloride and 0.1 mole of triethylaluminum, and the temperature was raised to 90° C with stirring. The system was pressurized with hydrogen to a total pressure of 7.2 kg/cm.$^2$G and then with a mixed ethylene-propylene gas containing 2 mole % of propylene to a total pressure of 10 kg/cm.$^2$G while polymerization was made for 1 hour in the procedure as in Example 1 to yield 150 g of a white polymer containing 6.9 methyl groups per 1,000 carbon atoms and having a melt index of 0.22 and a bulk density of 0.29. Catalyst activity was 30,170 g polymer/g Ti·hr·$C_2H_4$ pressure, 1,780 g polymer/g solid·hr·$C_2H_4$ pressure. The polymer had a flow parameter of 1.96 and its melt fluidity was extremely good.

We claim:

1. A process for preparing polyolefins by polymerizing or copolymerizing alpha- olefins at a temperature in the range of from 20° to 120° C and at a pressure in the range of atmospheric pressure to 70 Kg/cm.$^2$G., in the presence of a catalyst comprising a solid component and an organometallic compound component, characterized in that said solid component is obtained by copulverizing
   (1) a magnesium dihalide and/or a manganese dihalide,
   (2) an aromatic hydrocarbon selected from the group consisting of monocylic aromatic hydrocarbon and the halogen-and/or alkyl-substituted derivatives thereof and polycyclic aromatic hydrocarbon, the ratios of magnesium dihalide and/or manganese dihalide to said aromatic hydrocarbon being in the range of from 1:0.5 to 1:0.1,
   (3) a tetravalent titanium compound represented by the general formula Ti(OR)$_n$X$_{4-n}$ wherein R is an alkyl, allyl, aryl or aralkyl group having 1 to 20 carbon atoms, X is a halogen atom and n is a whole number of from 0 to 4, and
   (4) a trivalent titanium compound selected from the group consisting of titanium trihalides obtained by reducing titanium tetrachloride with hydrogen, aluminum, titanium or an oganometallic compound, and trivalent titanium compounds obtained by reducing tetravalent titanium alkoxyhalides represented by the general formula Ti(OR)$_n$X$_{4-n}$ wherein R is alkyl, allyl, aryl or aralkyl having 1 to 20 carbon atoms, X is a halogen atom and n is a whole number of from 1 to 4, with an organometallic compound of a metal of the groups I to III of the periodic table present in a molar ration with tetravalent titanium compound (3) of from 50:1 to 1:50 and in that said organometallic compound component is a mixture of
   (5) a trialkylaluminum and
   (6) a compound represented by the general formula AlR$_n$X$_{3-n}$ wherein R is alkyl having 1 to 10 carbon atoms and may be same or different, X is halogen and 0 < n < 3, said compound being present in a molar ratio with trialkyluminum (5) of from 2:1 to 1000:1.

2. A process according to claim 1 wherein the magnesium dihalide and the manganese dihalide are substantially anhydrous magnesium chloride and manganese chloride, respectively.

3. A process according to claim 1 wherein the copulverization is made for 0.5 to 50 hours in an inert gas atmosphere at a temperature in the range of from 0° to 200° C.

4. A process according to claim 1 wherein the solid component contains 0.5 to 20 weight percent of titanium.

5. A process according to claim 1 wherein the mixing ratio of a trialkylaluminum and a compound represented by the general formula $AlR_nX_{3-n}$ is such that the molar ratio of the former to the latter is in the range of from 1:200 to 1:3.

6. A process according to claim 1 wherein the oganometallic compound component is used in an amount corresponding to 0.1 to 1000 moles per mole of a trivalent and a tetravalent titanium compounds.

7. A process according to claim 1 wherein the polymerization or copolymerization of olefins is conducted with hydrogen added into the polymerization system.

8. The process of claim 1 wherein the monocyclic aromatic hydrocarbon is benzene, toluene, xylene and/or the halogen- and/or alkyl-substituted derivatives thereof.

9. The process of claim 1 wherein the polycyclic aromatic hydrocarbon is naphthalene, phenanthrene, triphenylene, chrysene, 3,4-benzophenanthrene, 1,2-benzochrysene, picene, anthracene, tetraphene, 1,2,3,4-dibenzanthracene, pentaphene, 3,4-benzopentaphene, tethracene, 1,2-benzotethracene, hexaphene, heptaphene, diphenyl, fluorene, biphenylene, perylene, coronene, bisantene, ovalene, pyrene, perinaphthene, and/or halogen- and/or alkyl- substituted derivatives thereof.

* * * * *

UNITED STATES PATENT AND TRADEMARK OFFICE
CERTIFICATE OF CORRECTION

PATENT NO. : 4,093,789

DATED : June 6, 1978

INVENTOR(S) : Kuroda, et al.

It is certified that error appears in the above-identified patent and that said Letters Patent are hereby corrected as shown below:

Column 1, line 19, "$0 \ll 3$" should read as -- $0 \leq n \leq 3$ --

Column 3, line 68, "$Al(Ch_2H_5)_2F$" should read as -- $Al(C_2H_5)_2F$ --

Column 8, line 66, "1,920" should read as -- 1,910 --

Column 9, line 67, "Tl" should read as -- Ti --.

Signed and Sealed this

Fourteenth Day of November 1978

[SEAL]

Attest:

RUTH C. MASON
Attesting Officer

DONALD W. BANNER
Commissioner of Patents and Trademarks